United States Patent [19]
Won et al.

[11] Patent Number: 6,029,873
[45] Date of Patent: Feb. 29, 2000

[54] RETRACTABLE ROOF RACK

[75] Inventors: Steve Won, Rochester; Trevor M. Creed, W. Bloomfield; Raymond C. Cannara, Ortonville; Robert J. Janosko, Bloomfield Hills, all of Mich.

[73] Assignee: Chrysler Corporation, Auburn Hills, Mich.

[21] Appl. No.: 09/227,135

[22] Filed: Jan. 8, 1999

[51] Int. Cl.⁷ .............................. B60R 9/045; B60R 9/04
[52] U.S. Cl. ........................ 224/321; 224/326; 224/309
[58] Field of Search ................................ 224/309, 314, 224/315, 316, 317, 318, 321, 322, 325, 326; 296/37.7

[56] References Cited

U.S. PATENT DOCUMENTS

| | | | |
|---|---|---|---|
| 3,002,664 | 10/1961 | Guevara | 224/320 X |
| 3,155,423 | 11/1964 | Cripe . | |
| 3,347,592 | 10/1967 | Renneker . | |
| 3,582,130 | 6/1971 | Borskey . | |
| 3,612,602 | 10/1971 | Stepp . | |
| 3,619,001 | 11/1971 | Borskey . | |
| 3,770,314 | 11/1973 | Borskey . | |
| 3,910,628 | 10/1975 | Nantau . | |
| 3,960,403 | 6/1976 | Carella et al. . | |
| 4,157,845 | 6/1979 | Queveau . | |
| 4,180,010 | 12/1979 | McDermott et al. | 224/311 X |
| 4,362,258 | 12/1982 | French | 224/309 |
| 4,727,688 | 3/1988 | Kida et al. . | |
| 4,830,428 | 5/1989 | Masuda et al. . | |
| 4,941,718 | 7/1990 | Alexander, III et al. | 296/37.7 X |
| 5,016,558 | 5/1991 | Oehler . | |
| 5,056,857 | 10/1991 | Ney et al. . | |
| 5,072,987 | 12/1991 | Allen . | |
| 5,074,614 | 12/1991 | Stefanski . | |
| 5,078,441 | 1/1992 | Borskey . | |
| 5,096,106 | 3/1992 | Foster et al. | 224/321 |
| 5,195,798 | 3/1993 | Klein et al. . | |
| 5,470,126 | 11/1995 | Hines . | |
| 5,513,470 | 5/1996 | Vollebregt . | |
| 5,581,954 | 12/1996 | Vollebregt . | |
| 5,647,630 | 7/1997 | Jambor et al. . | |
| 5,785,375 | 7/1998 | Alexander et al. . | |
| 5,809,701 | 9/1998 | Vollebregt . | |

FOREIGN PATENT DOCUMENTS

| | | | |
|---|---|---|---|
| 1056981 | 2/1953 | France | 224/309 |
| 1210262 | 3/1960 | France | 224/309 |
| 2699475 A1 | 6/1994 | France | 224/309 |
| 172752 | 3/1952 | Germany | 224/321 |
| 1043114 | 11/1958 | Germany | 224/325 |
| 2911785 | 10/1980 | Germany | 224/309 |
| 3039806 | 7/1982 | Germany | 224/320 |
| 3719974 | 12/1987 | Germany | 224/314 |
| 3826662 | 2/1990 | Germany | 224/314 |
| 4018009 | 12/1991 | Germany | 224/326 |
| 103204 | 12/1941 | Sweden | 224/314 |
| 450002 | 7/1936 | United Kingdom | 224/314 |

*Primary Examiner*—Gregory M. Vidovich
*Attorney, Agent, or Firm*—Mark P. Calcaterra

[57] ABSTRACT

A roof rack has a pair of laterally spaced apart rails. A pair of channels in a roof panel of an automotive vehicle are spaced apart the same distance as the rails. Operating mechanism is provided for moving the rails from a raised position of use projecting above the roof panel to a retracted position within the channels. The rails when retracted are substantially flush with the top surface of the roof panel.

4 Claims, 5 Drawing Sheets

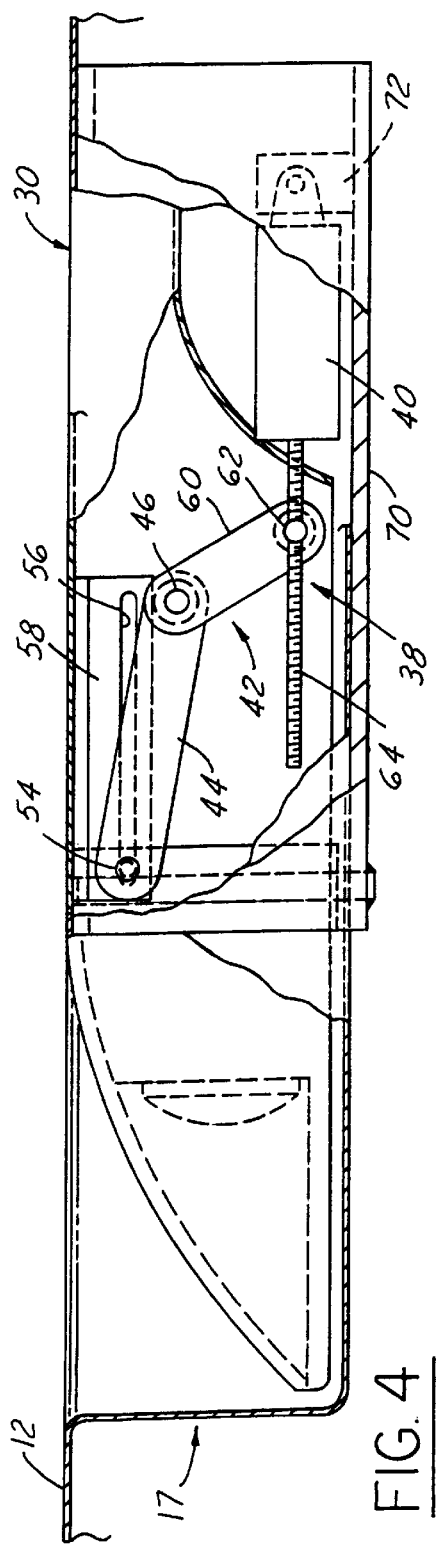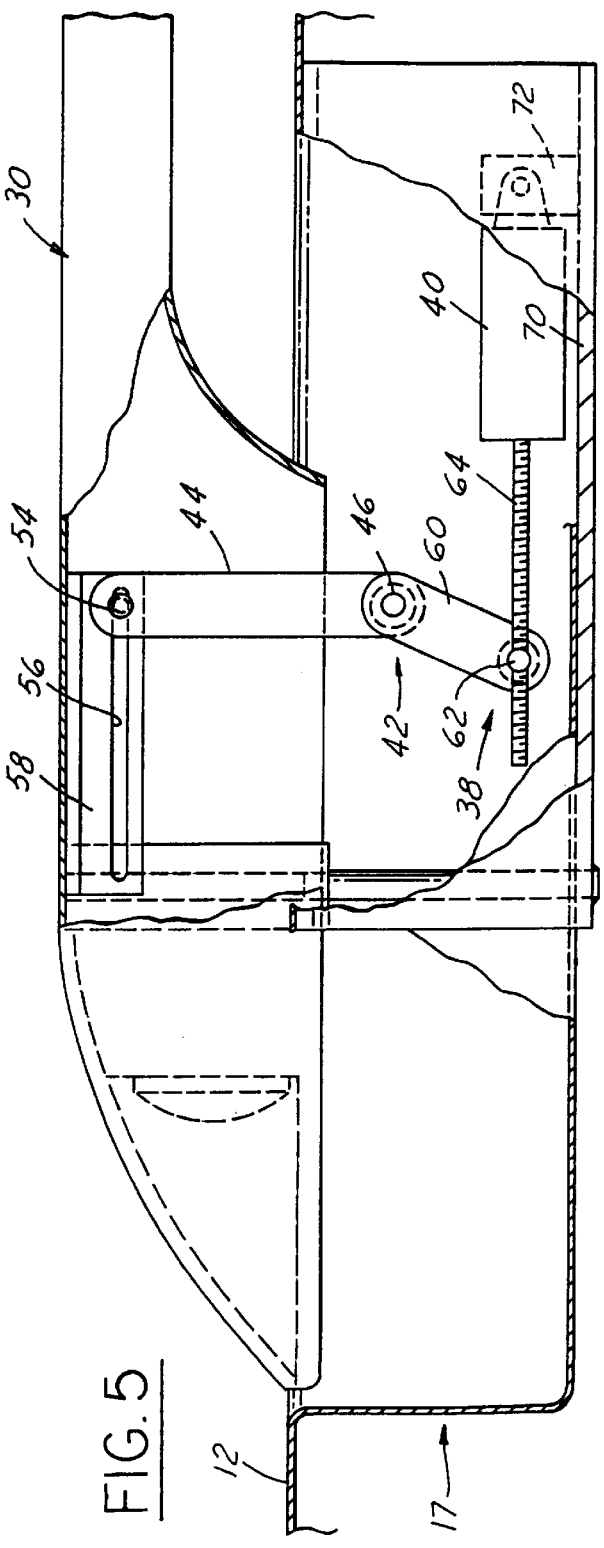

RETRACTABLE ROOF RACK

This invention relates generally to roof racks for automotive vehicles, and more particularly to a roof rack which may be retracted to a stored position when not in use.

BACKGROUND AND SUMMARY OF THE INVENTION

Typically, automotive roof racks are rigidly mounted in a fixed position on the roof of a motor vehicle. The roof rack assembly of the present invention was developed in order to enhance and improve the overall appearance and aerodynamics of the vehicle by making it possible to retract the roof rack to a stored position when not in use.

The roof rack assembly of this invention preferably includes a pair of spaced apart rails. A pair of channels in the roof panel of the vehicle are spaced apart the same distance as the rails. The rails are movable from a raised position of use projecting above the roof panel to a retracted position within the channels.

More specifically, the upper edges of the channels are flush with the roof panel, and the tops of the rails, when retracted, are also flush with the roof panel. Hence the rails, when retracted, are not normally visible and do not interfere with the overall aerodynamics of the vehicle.

Preferably the roof rack includes cross bars interconnecting the rails. Cross channels in the roof panel receive the cross bars when the rack is retracted.

In accordance with the specific embodiment about to be described, the mechanism for raising and lowering the rails includes an arm for each end of each rail. Each arm has an inner end pivoted to one of the channels. A sliding pivotal connection is provided between the outer ends of the arms and the respective rails so that by pivoting the arms back and forth, the rails may be raised and lowered. The arms are power-operated, preferably by one or more power units. The power units may be hydraulic or electric and are operated simultaneously so that both ends of the rails move up and down at the same time.

The rack is preferably guided in its movement between the upper and lower positions by an upright pin slidable in a tube or sleeve provided at each end of each of the rails.

One object of this invention is to provide a roof rack assembly having the foregoing features and capabilities.

Another object is to provide a roof rack assembly which is retractable, is rugged and durable in use, is composed of a relatively few simple parts, and can be easily operated and controlled by the driver.

These and other objects, features and advantages of the invention will become more apparent as the following description proceeds, especially when considered with the accompanying drawings.

BRIEF DESCRIPTION OF THE DRAWINGS

FIG. 4 is an enlarged fragmentary side view, with parts in section, showing one end portion of a rail retracted to a position within a supporting channel.

FIG. 5 is a view similar to FIG. 4 but showing the rail of the roof rack in the raised position.

DETAILED DESCRIPTION OF THE PREFERRED EMBODIMENT

Referring now more particularly to the drawings, there is shown a roof rack assembly 10 mounted on a generally horizontal upper roof panel 12 of an automotive vehicle 14.

Figure 1:
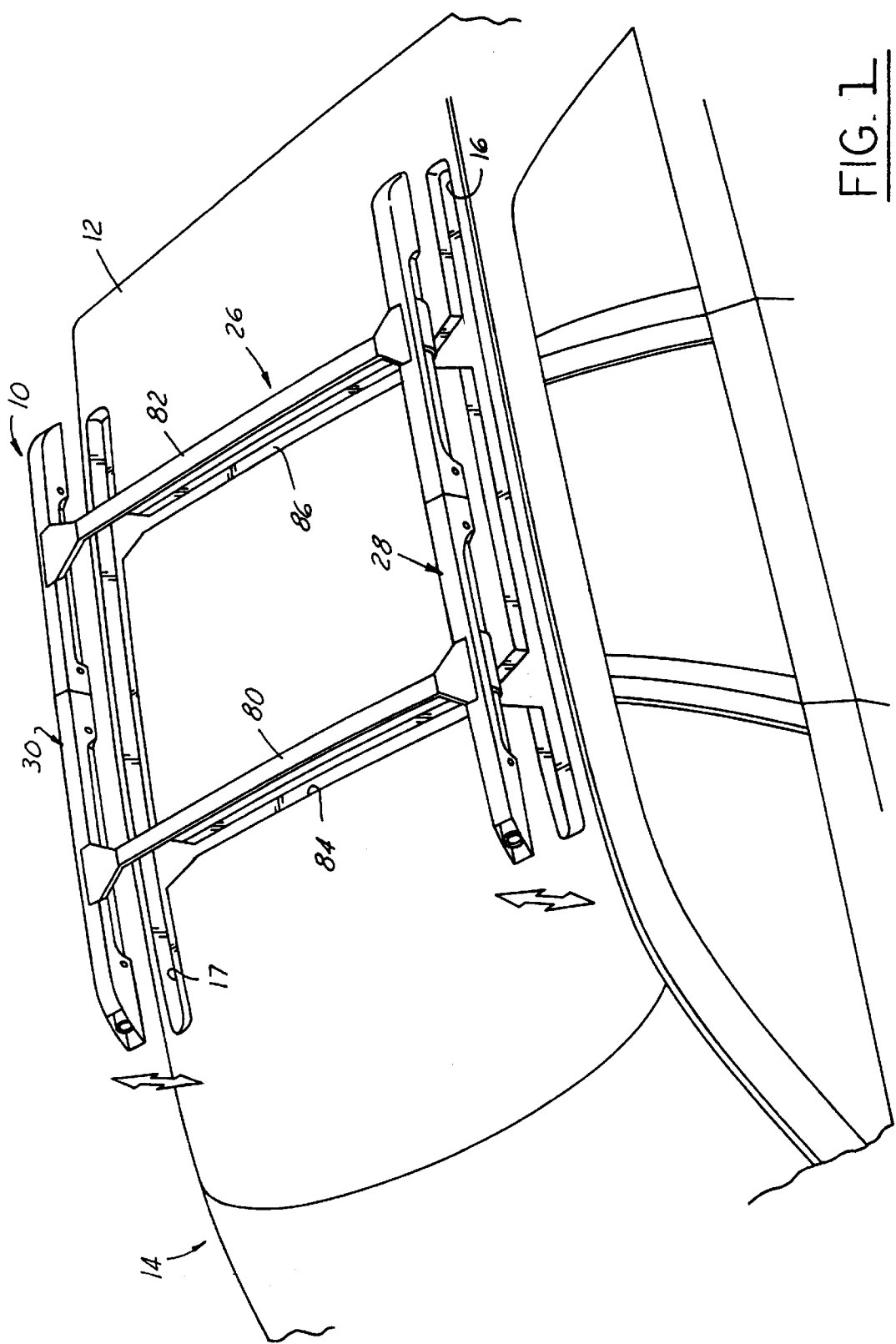
FIG. 1 is a fragmentary perspective view showing the roof rack assembly of this invention positioned above the roof panel of an automotive vehicle. The roof rack assembly is separated from the roof panel in this figure and the mechanism for raising and lowering the roof rack is not shown, in the interest of clarity.
Figure 2:
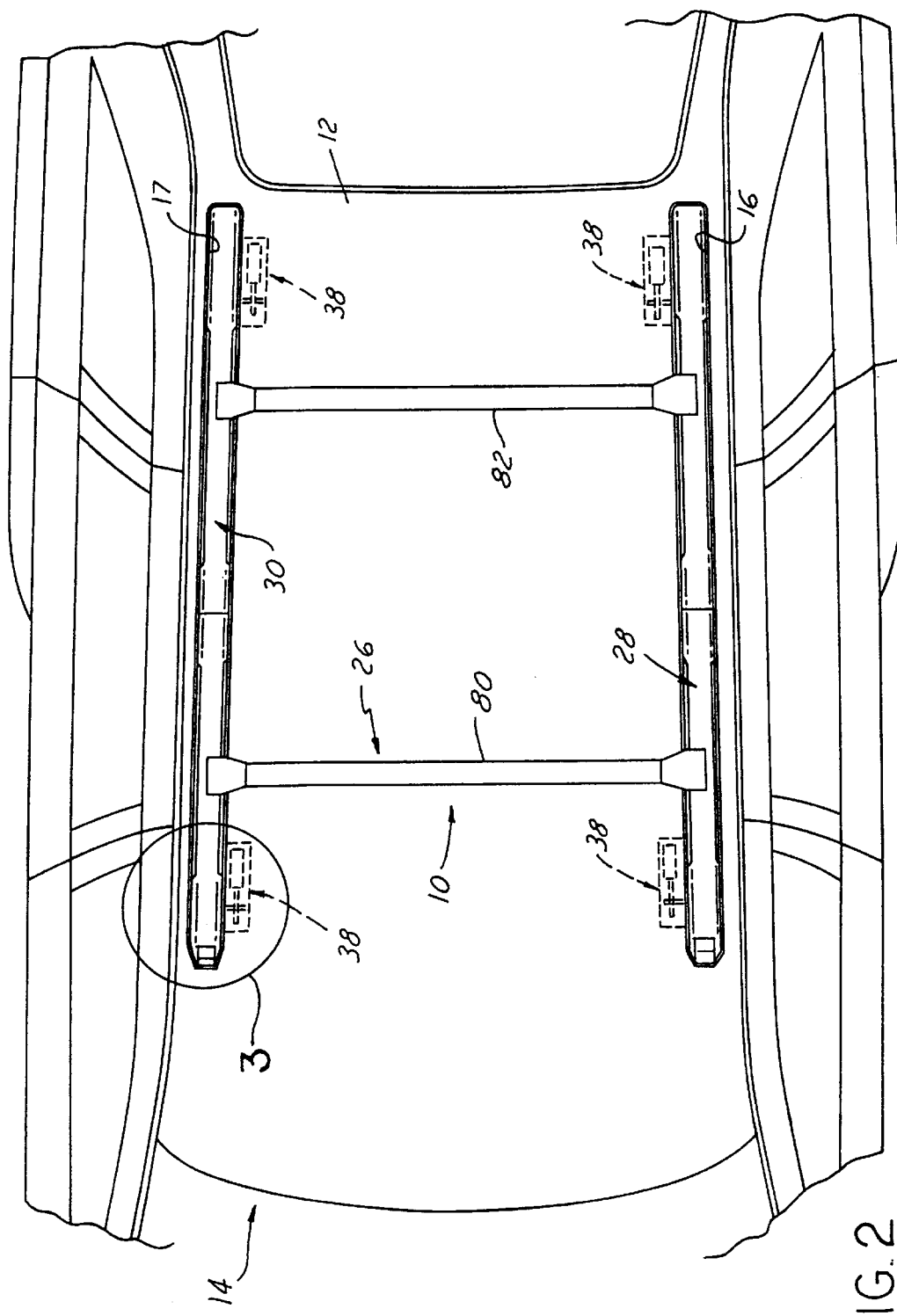
FIG. 2 is a fragmentary top plan view of the roof rack assembly in its position mounted on the roof panel of the automotive vehicle.
Figure 3:
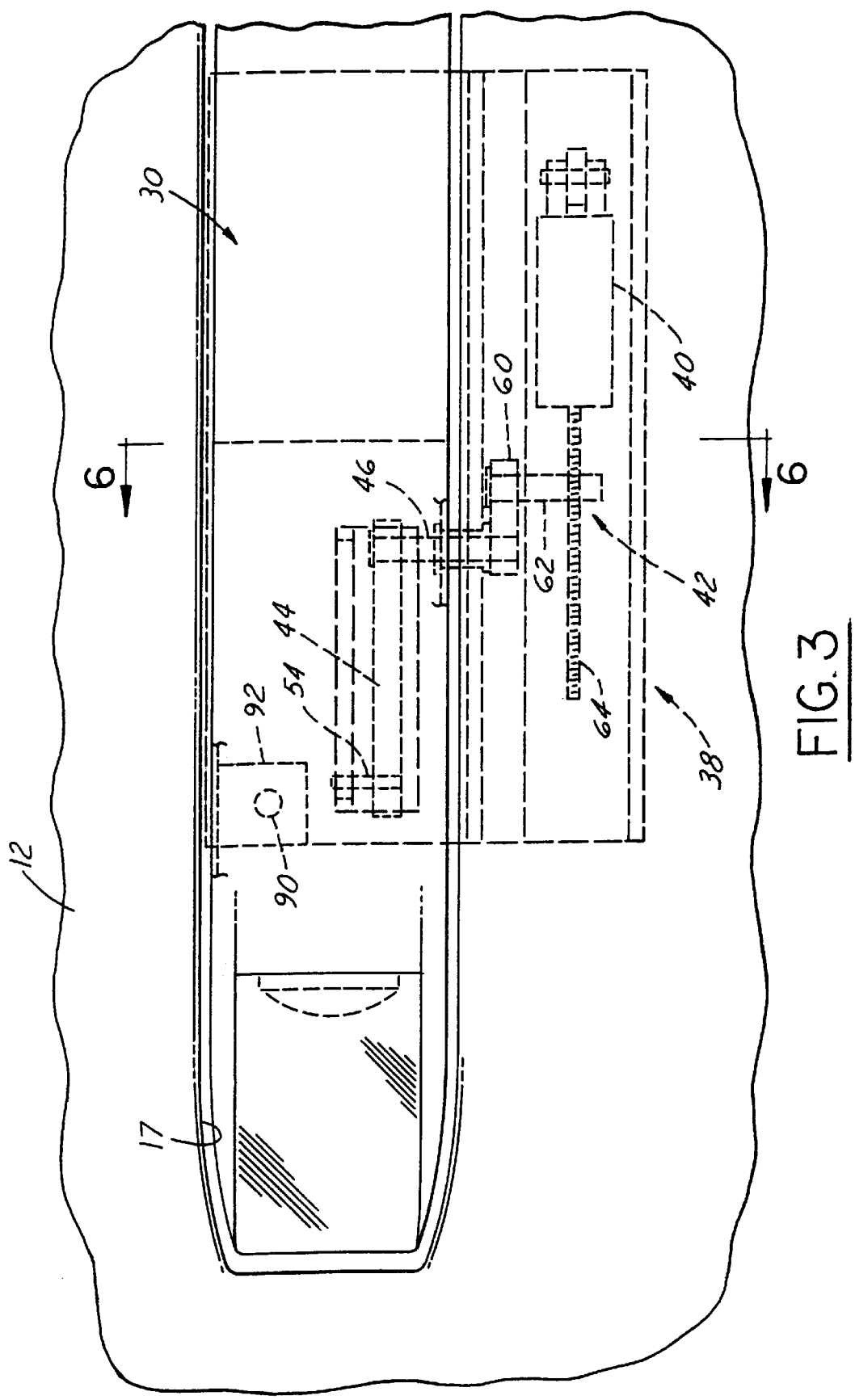
FIG. 3 is an enlarged view of the structure shown within the circle 3 in FIG. 2.
Figure 6:
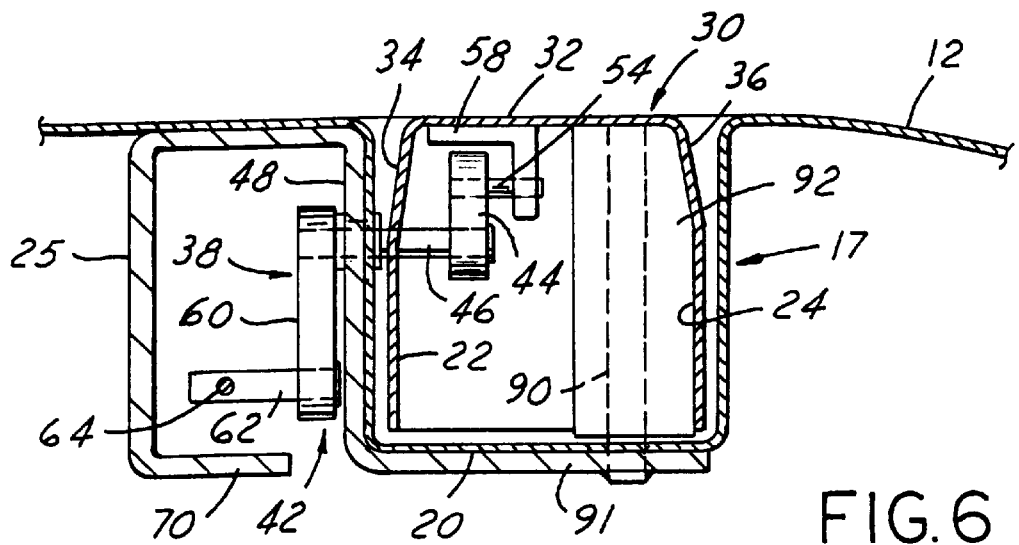
FIG. 6 is a sectional view taken on the line 6—6 in FIG. 3, showing a rail of the rack assembly in the retracted position.
Figure 7:
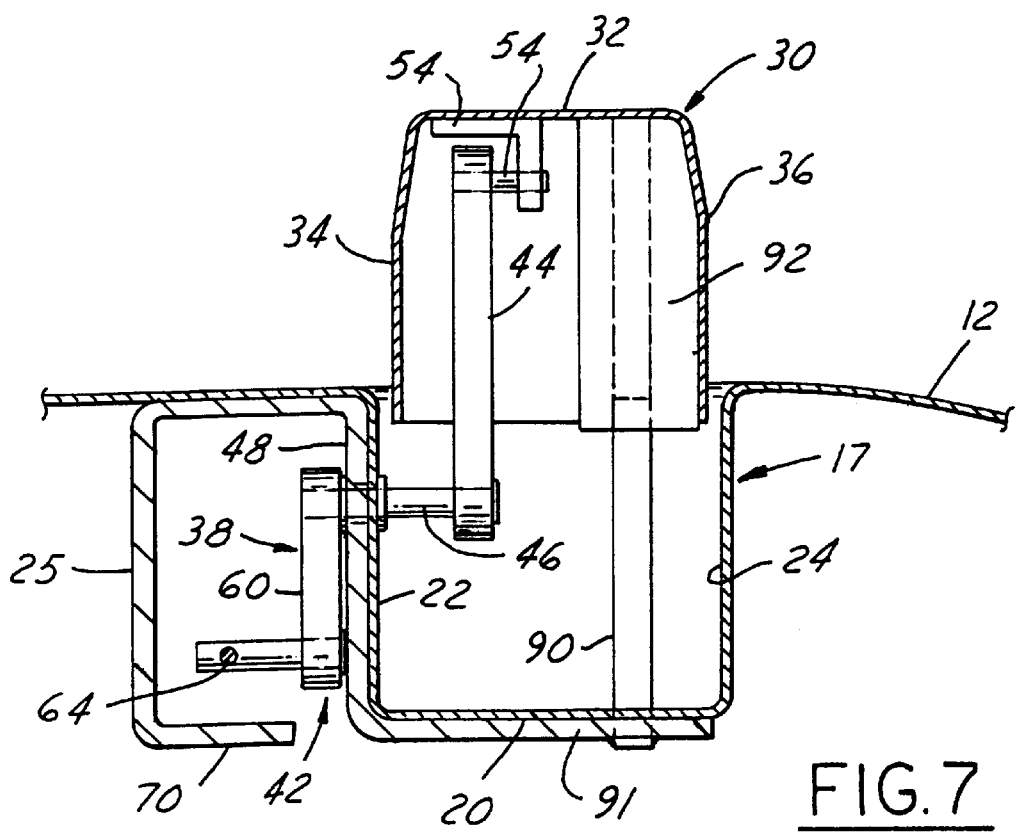
FIG. 7 is a view similar to FIG. 6 but shows the rail in the raised position suitable for use.

The roof rack assembly 10 includes a pair of elongated, laterally spaced apart parallel channels 16 and 17. The channels are mounted in the roof panel 12 and extend downwardly beneath the top surface of the roof panel. The channels are substantially identical in form and may be made integrally with the roof panel 12 as shown in FIGS. 6 and 7, having the horizontal bottom wall 20 and the vertical side walls 22 and 24. The upper edges of the channels do not extend above the roof panel 12 and are preferably flush with the top surface thereof. Each channel is reinforced from end to end by a bracket 25 secured thereto and having the configuration shown in FIGS. 6 and 7.

The roof rack assembly 10 also includes a rack 26 comprising a pair of elongated parallel rails 28 and 30 spaced apart the same distance as the channels 16 and 17. The rails are movable from a raised position shown in FIGS. 5 and 7, in which they project above the roof panel for use, to a retracted position shown in FIGS. 4 and 6 in which the rails are stored within the respective channels. Each rail preferably has the configuration shown in FIGS. 6 and 7, being formed with a horizontal top wall 32 and laterally spaced generally vertical side walls 34 and 36. In the retracted or stored position in which the rails are disposed within the channels, the top walls 32 of the rails are substantially flush with the top surface of the outer roof panel 12 from one end of the rails to the other.

The rails are movable between the raised and retracted positions by an operating mechanism 38 at each end of each rail and best illustrated in FIGS. 3–7. Such mechanism includes a motor 40 and linkage 42 at each end of each rail. The linkage 42 includes an arm 44 having an inner end secured to an end of a horizontal pivot pin 46. The pivot pin 46 is rotatably mounted in the side wall 22 of the associated channel and in a wall 48 of the bracket 25.

The arm 44 has a pin 54 on the outer end which slides in a horizontal slot 56 in a bracket 58 secured to an end portion of the rail, providing a sliding pivotal connection. The linkage 42 includes a second arm 60 having an inner end secured to the opposite end of the pivot pin 46. The outer end of arm 60 has a laterally extending rotatable pin 62. A threaded drive shaft 64 of the motor 40 threads through the pin 62 so that operation of the motor rotates the shaft 64 and causes arms 44 and 60 to turn about the axis of the pivot pin 46. The motor 40 is mounted on a bottom wall 70 of the bracket 25 for vertical pivotal movement by a base block 72.

When the motor 40 is operated in one direction to rotate the drive shaft 64 in one direction, the arm 44 is pivoted to the FIG. 4 position to lower the rail. When the motor 40 is driven in the opposite direction causing a reverse rotation of the drive shaft 64, the arm 44 is turned to the position of FIG. 5, to elevate the rail.

As previously stated, there is an operating mechanism 38 at each end of each rail, each including a motor 40 and linkage 42. A switch (not shown) will normally be provided on the dashboard of the vehicle, or in some position for convenient operation, effective to energize all of the four motors simultaneously, so that the rails will be raised to a position of use shown in FIGS. 5 and 7, or lowered to the retracted position of FIGS. 4 and 6.

Each end of each rail is guided so that it moves vertically between the raised and lowered positions. To this end, a vertical pin 90 has its lower end secured to the bottom wall 20 of a channel 16, 17 and to a wall 91 of bracket 25, and extends vertically upward within the channel. The pin is slidably received in a central passage of a vertical tube or sleeve 92 secured within a rail 28, 30. There is a pin 90 and tube 92 at each end of each rail.

The rails are interconnected by a pair of longitudinally spaced laterally extending parallel cross bars 80, 82. The roof panel 12 of the vehicle has parallel, transverse cross channels 84, 86 spaced apart the same distance as the cross bars 80, 82 to receive the cross bars in the retracted position of the rails such that the top surfaces of the cross bars are flush with the top surface of the roof panel 12.

What is claimed is:

1. A roof rack assembly for an automotive vehicle comprising;
    a roof panel,
    a pair of spaced apart channels in the roof panel,
    a roof rack comprising a pair of rails spaced apart the same distance as said channels,
    means for moving said rails from a raised position of use projecting above the roof panel to a retracted position within said channels,
    said means for moving said rails comprising at least one arm for each of said rails,
    each said arm having an inner end pivoted to one of said channels and an outer end,
    means providing a sliding pivotal connection between the outer ends of said arms and said respective rails,
    means for pivoting said arms, and
    guide means for guiding each of said rails in its movement between the raised and retracted positions thereof,
    wherein said guide means comprises at least one upright pin member and at least one tubular member for each of said rails slidably receiving said pin member, one of said members being mounted on one of said channels and the other of said members being mounted on one of said rails.

2. A roof rack assembly for an automotive vehicle comprising;
    a roof panel,
    a pair of spaced apart channels in the roof panel,
    a roof rack comprising a pair of rails spaced apart the same distance as said channels,
    means for moving said rails from a raised position of use projecting above the roof panel to a retracted position within said channels,
    said means for moving said rails comprising operating mechanism including at least one arm for each end of each of said rails,
    each said arm having an inner end pivoted to one of said channels and an outer end,
    means providing a sliding pivotal connection between the outer ends of said arms and said respective rails,
    means for pivoting said arms,
    further including guide means for guiding said rails between the raised and retracted positions thereof, said guide means comprising at each end of each rail an upright pin and a tubular member slidably receiving said pin, said pins being mounted on said respective channels and said tubular members being mounted on said respective rails.

3. A roof rack assembly as defined in claim 2, wherein said channels have upper edges flush with the roof panel, and said rails have upper surfaces which, when said rails are in their retracted position, are flush with the roof panel.

4. A roof rack assembly as defined in claim 3, further including cross-bars interconnecting said rails, and cross channels in the roof panel receiving said cross-bars in the retracted position of said rails, said cross-bars having upper surfaces which, when said rails are in their retracted positions, are flush with the roof panel.

* * * * *